US012671207B2

(12) United States Patent
Maegawa et al.

(10) Patent No.: US 12,671,207 B2
(45) Date of Patent: Jun. 30, 2026

(54) HERMETIC TERMINAL AND MANUFACTURING METHOD OF SAME

(71) Applicant: SCHOTT AG, Mainz (DE)

(72) Inventors: Yusuke Maegawa, Koka (JP); Hiroki Honda, Koka (JP); Akira Fujioka, Koka (JP); Daisuke Fukushima, Koka (JP)

(73) Assignee: SCHOTT AG, Mainz (DE)

( * ) Notice: Subject to any disclaimer, the term of this patent is extended or adjusted under 35 U.S.C. 154(b) by 586 days.

(21) Appl. No.: 18/041,268

(22) PCT Filed: Jan. 19, 2022

(86) PCT No.: PCT/JP2022/001681
§ 371 (c)(1),
(2) Date: Oct. 13, 2023

(87) PCT Pub. No.: WO2022/259597
PCT Pub. Date: Dec. 15, 2022

(65) Prior Publication Data

US 2023/0335941 A1 Oct. 19, 2023

(30) Foreign Application Priority Data

Jun. 11, 2021 (JP) ................................. 2021-097765
Sep. 28, 2021 (JP) ................................. 2021-157319

(51) Int. Cl.
*H01R 9/16* (2006.01)
*H01R 13/52* (2006.01)
*H01R 43/20* (2006.01)

(52) U.S. Cl.
CPC ........... *H01R 13/5202* (2013.01); *H01R 9/16* (2013.01); *H01R 43/20* (2013.01)

(58) Field of Classification Search
None
See application file for complete search history.

(56) References Cited

U.S. PATENT DOCUMENTS 4,984,973 A * 1/1991 Itameri-Kinter ..... H01R 13/521 439/926
5,391,061 A * 2/1995 Iizuka ................ H01R 13/5202 439/935

(Continued)

FOREIGN PATENT DOCUMENTS

CN 103682793 A 3/2014
CN 206098769 U * 4/2017

(Continued)

OTHER PUBLICATIONS

International Search Report for PCT/JP2022/001681 mailed on Feb. 22, 2022.

*Primary Examiner* — Tho D Ta
(74) *Attorney, Agent, or Firm* — Dennemeyer & Associates LLC

(57) ABSTRACT

To provide a hermetic terminal with an insulating cylinder, the hermetic terminal being applicable to insulation coatings that pose difficulties with known insert molding methods, and being producible in small lots without changing the mold for each change in a ring-like outer metal member, and a manufacturing method thereof.
Means for Solving Problem
A hermetic terminal includes a ring-like outer metal member including at least one sealing hole, a lead inserted through the sealing hole of the ring-like outer metal member, an insulating material hermetically sealing the lead to the ring-like outer metal member, and an insulating cylinder fitted onto the lead and adhering, at at least an end portion of the insulating cylinder, to the ring-like outer metal member. The insulating cylinder either is formed with one or more circumferential grooves in an outer circumferential wall and includes a sealing member composed of an elastic material in the one or more circumferential grooves, or includes a protrusion formed by extending a portion of an (Continued)

outer diameter portion of the insulating cylinder and surrounding the outer diameter portion.

15 Claims, 4 Drawing Sheets

(56) References Cited

U.S. PATENT DOCUMENTS

| | | | | | |
|---|---|---|---|---|---|
| 5,493,073 | A * | 2/1996 | Honkomp | H01B 17/305 | 439/150 |
| 6,273,754 | B1 * | 8/2001 | Bunch | H01R 13/405 | 439/935 |
| 6,509,525 | B2 * | 1/2003 | Honkomp | H01B 17/303 | 439/935 |
| 2012/0228023 | A1 * | 9/2012 | Fukasaku | F04C 18/0215 | 174/668 |

FOREIGN PATENT DOCUMENTS

| | | | |
|---|---|---|---|
| CN | 112823242 | A | 5/2021 |
| JP | 53-51490 | A | 5/1978 |
| JP | 58-155684 | A | 9/1983 |
| JP | 6-185463 | A | 7/1994 |
| JP | H5-144493 | A | 7/1994 |
| JP | 2015-528631 | A | 9/2015 |
| WO | 2020/171048 | A1 | 8/2020 |

* cited by examiner

HERMETIC TERMINAL AND MANUFACTURING METHOD OF SAME

CROSS-REFERENCE TO RELATED APPLICATIONS

This is a 35 U.S.C. 371 National Stage Patent Application of International Application No. PCT/JP2022/001681, filed Jan. 19, 2022, which claims priority to Japanese application 2021-157319, filed Sep. 28, 2021, and Japanese application 2021-097765, filed Jun. 11, 2021, each of which is hereby incorporated by reference in its entirety.

TECHNICAL FIELD

The present invention relates to a hermetic terminal or to a hermetic terminal used for an electric compressor for an automotive application.

BACKGROUND ART

A hermetic terminal is formed by hermetically sealing a lead in an insertion hole of an eyelet or a ring-like outer metal member with a glass insulating material, and is used in supplying a current to an electrical device or element accommodated in a hermetic container or in guiding a signal from the electrical device or element to the outside. For example, as disclosed in WO 2010/117000 (Patent Document 1), a hermetic terminal used in a compressor of a refrigerator or an air conditioner is a ring-like outer metal member including a top plate portion, a cylindrical portion extending downward from an outer peripheral end of the top plate portion, a flange portion extending obliquely outward from a lower end of the cylindrical portion, and three small tubular portions that form lead sealing holes extending inward from the top plate portion. Then, one sealed lead is hermetically sealed in each of the lead sealing holes of the ring-like outer metal member by using a glass insulating material for sealing.

Now, in some hybrid vehicles, the engine is configured to stop when the vehicle temporarily stops at, for example, a traffic light for the intended purpose of reducing the impact of the engine on the environment. When temporarily stopping in this way, if the vehicle uses a compressor driven by the engine, the air conditioning stops each time the vehicle stops, which is particularly problematic in extremely cold locations in winter and extremely hot locations in summer. Therefore, in hybrid vehicles and electric vehicles, a compressor driven by an electric motor, that is, a compressor with a built-in electric motor that has both a compression mechanism and an electric motor incorporated in a hermetic container in the same way as an indoor air conditioner is used in place of a compressor driven by the engine. In consideration of installation in narrow engine rooms, these electric compressors for automotive applications are preferably space-saving, small, and lightweight to the furthest extent possible. Because the electric motor is driven through a hermetic terminal attached to a terminal attachment hole of the hermetic container, the pins of most hermetic terminals used for such compressors are disposed in series in a single line to achieve space reduction, as disclosed in, for example, CN 206098769 U (Patent Document 2). Such hermetic terminals for automotive electric compressors include hermetic terminals provided with an insulation coating made of a refrigerant/oil-resistant rubber on an outer lead and a ring-like outer metal member inside the container, as disclosed in JP 2020-136061 A (Patent Document 3).

CITATION LIST

Patent Literature

Patent Document 1: WO 2010/117000
Patent Document 2: CN 206098769 U
Patent Document 3: JP 2020-136061 A

SUMMARY OF INVENTION

Technical Problem

The hermetic terminal for an automotive electric compressor described above is provided with the insulation coating made of a refrigerant/oil-resistant rubber on the outer lead and the ring-like outer metal member inside the container. The insulation coating made of rubber is integrally molded with the hermetic terminal by insert molding. Nevertheless, with insert molding, different molds need to be prepared for different shapes of the ring-like outer metal member in the ring-like outer metal member portion of the hermetic terminal. Further, with insert molding, tearing, peeling, and the like occur to the hermetic terminal with thin insulation coating due to factors such as releasability, resulting in a poor yield. Thus, insert molding is not always suitable for forms with thin portions.

The present invention provides a hermetic terminal with an insulating cylinder, the hermetic terminal being applicable to forms of insulation coatings that are difficult to mold by known insert molding methods, and being producible in small lots without preparation of dedicated molds corresponding to different shapes of a ring-like outer metal member, and a manufacturing method thereof.

SUMMARY OF INVENTION

A hermetic terminal according to a first embodiment of the present invention includes a ring-like outer metal member including a sealing hole, a lead inserted through the sealing hole of the ring-like outer metal member, an insulating material hermetically sealing the lead to the ring-like outer metal member, and an insulating cylinder made of plastic having heat resistance and oil/refrigerant resistance, the insulating cylinder being fitted onto the lead and hermetically adhering, at at least an end portion of the insulating cylinder, to the insulating material or the ring-like outer metal member via an adhesive layer. The insulating cylinder includes one or more circumferential grooves in an outer circumferential wall and includes a sealing member composed of an elastic material having heat resistance and oil/refrigerant resistance in the one or more circumferential grooves. The ring-like outer metal member may be further provided with a through-hole for a spiral lock, as necessary. The insulating cylinder may be made of rubber.

A hermetic terminal according to a second embodiment of the present invention includes a ring-like outer metal member including a sealing hole, a lead inserted through the sealing hole of the ring-like outer metal member, an insulating material hermetically sealing the lead to the ring-like outer metal member, and an insulating cylinder made of rubber having heat resistance and oil/refrigerant resistance, the insulating cylinder being fitted onto the lead and hermetically adhering, at at least an end portion of the insulating cylinder, to the insulating material or the ring-like outer metal member via an adhesive layer. The insulating cylinder includes one or more protrusions surrounding an outer diameter of the insulating cylinder. The insulating cylinder is composed of a molded member made of rubber providing a sealing function in the insulating cylinder itself. The insulating cylinder has a sealing function by the insulating cylinder only, and thus may be only provided with a protrusion for sealing on an outer diameter portion of the insulating cylinder. A plurality of the protrusions may be provided. The ring-like outer metal member may be further provided with a through-hole for a spiral lock, as necessary.

A manufacturing method of a hermetic terminal according to the present invention includes (1) first, placing a ring-like outer metal member including a sealing hole at a predetermined position of a sealing jig prepared in advance, placing a tablet made of an insulating material into the sealing hole, the tablet including an insertion hole for inserting a lead, further placing the lead into the insertion hole with the lead penetrating and being inserted through the insertion hole and, while maintaining this state, temporarily assembling on the sealing jig a sealing component including the ring-like outer metal member, the insulating material, and the lead of a hermetic terminal. (2) Subsequently, the manufacturing method includes passing the sealing jig on which the sealing component is placed through a sealing furnace adjusted in atmosphere and in temperature to predetermined sealing conditions to obtain a hermetic terminal with the lead insulated from and sealed to the ring-like outer metal member by the insulating material. (3) The manufacturing method may include forming a plating layer on a desired metal surface of the hermetic terminal after sealing, as necessary. (4) The manufacturing method includes further applying an adhesive to a predetermined surface of the insulating material or the ring-like outer metal member of the hermetic terminal after sealing. The application of the adhesive may be extended to a portion of the lead, as necessary. (5) Lastly, the manufacturing method includes fitting an insulating cylinder made of plastic or rubber having heat resistance and oil/refrigerant resistance and prepared in advance onto the lead, pressing the insulating cylinder such that the insulating cylinder comes into close contact with an application surface of the adhesive, and curing the adhesive to adhere the insulating cylinder to the hermetic terminal. The insulating cylinder includes one of a sealing member of an elastic material having heat resistance and oil/refrigerant resistance in a circumferential groove formed in an outer diameter portion, or a protrusion formed by extending a portion of an outer diameter portion of the insulating cylinder and surrounding the outer diameter portion. The hermetic terminal of the present invention manufactured by the manufacturing method is subsequently hermetically fixed, by a spiral fastening or the like, to a hermetic container accommodating an electrical device. At this time, the hermetic terminal may be fixed to the hermetic container with a gasket interposed between the hermetic container and the ring-like outer metal member of the hermetic terminal, as necessary.

A hermetic container according to the present invention is a hermetic container including the hermetic terminal described above, and includes a container body accommodating an electrical device such as an electric motor, a hermetic terminal closing an insertion hole extending through the container body and hermetically fixed to the container body, and a wiring block (also referred to as a connector block) of the electrical device electrically connected in a watertight manner to a lead of the hermetic terminal disposed in an interior of the container body.

The hermetic terminal includes a ring-like outer metal member including a sealing hole, a lead inserted through the sealing hole of the ring-like outer metal member, an insulating material hermetically sealing the lead to the ring-like outer metal member, and an insulating cylinder made of plastic or rubber having heat resistance and oil/refrigerant resistance, the insulating cylinder being fitted onto the lead and adhering, at at least an end portion of the insulating cylinder, to the insulating material or the ring-like outer metal member. The insulating cylinder is composed of one of an insulating cylinder including one or more circumferential grooves in an outer circumferential wall and a sealing member composed of an elastic material having heat resistance and oil/refrigerant resistance fitted into the one or more circumferential grooves, or an insulating cylinder including one or more protrusions formed by extending a portion of an outer diameter portion of the insulating cylinder and surrounding the outer diameter portion. The ring-like outer metal member may be further provided with a through-hole provided for spirally locking the ring-like outer metal member to the container body, as necessary. The through-hole is provided for fastening and hermetically fixing the hermetic terminal of the present invention to the container body of the electrical device by means such a spiral lock. Provided that the ring-like outer metal member of the hermetic terminal is fixed to a container wall of the container body, other forms instead of this through-hole, such as a presser, may be adopted. Such a presser is a frame body that covers, in a frame shape, at least an outer peripheral edge of the ring-like outer metal member and an outer peripheral edge of the insertion hole, and fixes the ring-like outer metal member and the container body to each other with the hermetic terminal interposed therebetween so that the ring-like outer metal member of the hermetic terminal does not fall out of the insertion hole.

Advantageous Effects of Invention

A brief description of the advantageous effects obtained by a representative aspect of the present disclosure is as follows. According to an embodiment of the present disclosure, provided is a hermetic terminal with an insulating cylinder, the hermetic terminal being producible in small lots without changing the mold to deal with different shapes of a ring-like outer metal member.

DESCRIPTION OF EMBODIMENTS

Figure 1:
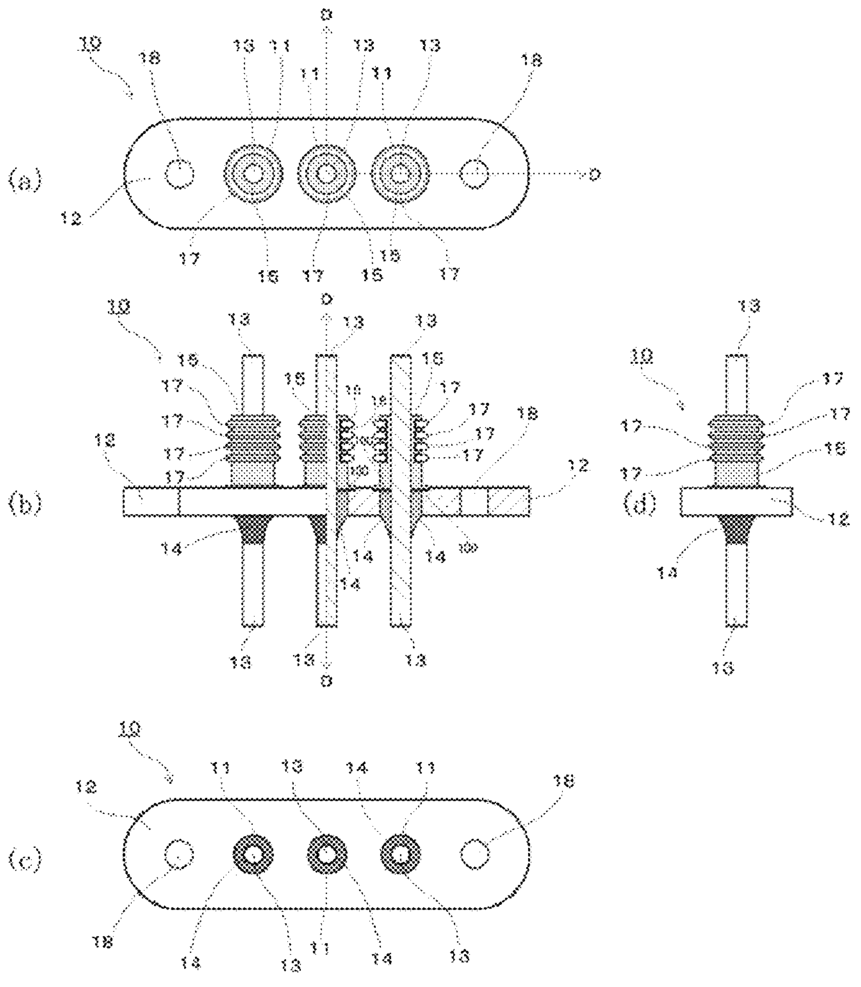
FIG. 1 illustrates a hermetic terminal 10 according to the present invention, where (a) is a plan view, (b) is a front partial cross-sectional view taken along line D-D of (a), (c) is a bottom view, and (d) is a side view.

A hermetic terminal 10 according to the present invention includes, as illustrated in FIG. 1, a ring-like outer metal member 12 including a sealing hole 11, a lead 13 inserted through the sealing hole 11 of the ring-like outer metal member 12, an insulating material 14 made of glass and hermetically sealing the lead 13 to the ring-like outer metal member 12, and an insulating cylinder 15 made of plastic, the insulating cylinder 15 being fitted onto the lead 13 and hermetically adhering, at at least an end portion of the insulating cylinder 15, to the insulating material 14 or the ring-like outer metal member 12 via an adhesive layer 100. The insulating cylinder 15 includes one or more circumferential grooves 16 in an outer circumferential wall and a sealing member 17 composed of an elastic material having heat resistance and oil/refrigerant resistance in the circumferential groove 16. The insulating cylinder 15 is composed of a molded member molded of a super engineering plastic such as polybutylene terephthalate (PBT), polyphenylene sulfide (PPS), or polyetheretherketone (PEEK), which has heat resistance and oil/refrigerant resistance. The ring-like outer metal member 12 may be further provided with a through-hole 18 for a spiral lock, as necessary. The insulating cylinder 15 extends a creepage distance of an insulating portion that insulates an area between the ring-like outer metal member 12 and the lead 13, and forms an attachment base portion of the sealing member 17. The plastic material constituting the insulating cylinder 15 preferably has a volume resistivity of $1\times10^{13}$ Ω·cm or greater. When the insulating cylinder 15 and the sealing member 17 are constituted by different materials, it is possible to apply, in combination, a material having the structural strength and electrical insulation required for the insulating cylinder 15 and a material having the elastic performance required for the sealing member 17, and also improve the structural strength, electrical insulation, and sealing properties of the insulation coating, which have been trade-offs to date, making changes and adjustments thereof much easier. For example, it is possible to keep the compression set of the seal low while maintaining structural strength in a high-temperature refrigerant, and thus maintain stable sealing performance over a long period of time in a watertight connector block disposed in a hermetic container. The insulating cylinder 15 can be commonly utilized regardless of the shape of the ring-like outer metal member 12, thus eliminating the need to prepare a corresponding mold with each change in shape in the ring-like outer metal member as in insert molding. Further, molding yield of a thin portion, such as the circumferential groove 16, which has been problematic in known insert molding, can be solved by separately molding only the insulating cylinder 15 made of plastic and retrofitting the insulating cylinder 15 in the assembly process of the hermetic terminal. Because the insulating cylinder 15 is molded as a single piece of plastic, interaction with the hermetic terminal during molding or mold release is eliminated and yield is improved.

Figure 2:
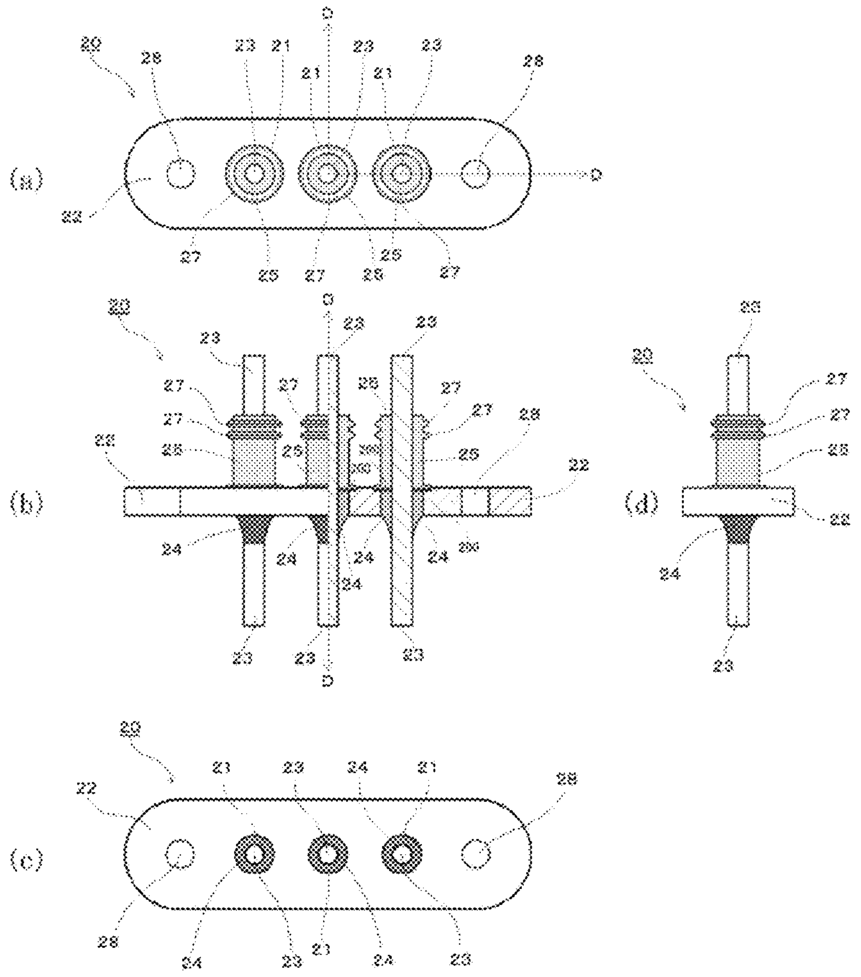
FIG. 2 illustrates a hermetic terminal 20 according to the present invention, where (a) is a plan view, (b) is a front partial cross-sectional view taken along line D-D of (a), (c) is a bottom view, and (d) is a side view.

As illustrated in FIG. 2, a hermetic terminal 20 according to the present invention includes a ring-like outer metal member 22 including a sealing hole 21, a lead 23 inserted through the sealing hole 21 of the ring-like outer metal member 22, an insulating material 24 made of glass and hermetically sealing the lead 23 to the ring-like outer metal member 22, and an insulating cylinder 25 made of rubber, the insulating cylinder 25 being fitted onto the lead 23 and hermetically adhering, at at least an end portion of the insulating cylinder 25, to the insulating material 24 or the ring-like outer metal member 22 via an adhesive layer 200. The insulating cylinder 25 includes one or more protrusions 27 surrounding an outer diameter of an outer circumferential wall. The insulating cylinder 25 is composed of a molded member made of rubber having heat resistance and oil/refrigerant resistance, such as hydrogenated nitrile rubber (HNBR) or ethylene-propylene-diene rubber (EPDM), which provides a sealing function in the insulating cylinder itself. The insulating cylinder 25 has a sealing function by the insulating cylinder only, and thus may be only provided with the protrusion 27 for sealing on an outer diameter portion of the insulating cylinder 25. A plurality of the protrusions 27 having a headband shape may be provided. The ring-like outer metal member 22 is further provided with a through-hole 28 for a spiral lock, as necessary. The insulating cylinder 25 has a function of extending the creepage distance of an insulating portion that insulates an area between the ring-like outer metal member 22 and the lead 23. The rubber material constituting the insulating cylinder 25 preferably has a volume resistivity of $1\times10^{13}$ Ω·cm or greater. The insulating cylinder 25 can be commonly utilized regardless of the shape of the ring-like outer metal member 22, eliminating the need to prepare a corresponding mold with each change in shape in the ring-like outer metal member as in insert molding. The insulating cylinder 25 is molded as a single piece of rubber, eliminating interaction with the hermetic terminal during molding or mold release and improving yield.

A desired plating coating can be applied to a front surface of the lead of the hermetic terminal according to the present invention. Further, the lead and the ring-like outer metal member may be constituted by any material as long as the material is a metal material applicable to hermetic terminals. For example, the material is not limited to an Fe—Cr alloy and may be changed to an Fe—Ni alloy, carbon steel, a copper alloy, an aluminum alloy, or the like. Similarly, the insulating material described in the examples is not limited to soda barium glass, and any glass material can be used as long as the material can electrically insulate and hermetically seal the lead from and to the ring-like outer metal member. The insulating material according to the present invention may be partly formed of glass materials that differ from each other, as needed. The glass material may also be replaced, in part or in whole, with a resin material such as an epoxy resin, as needed.

Figure 3:
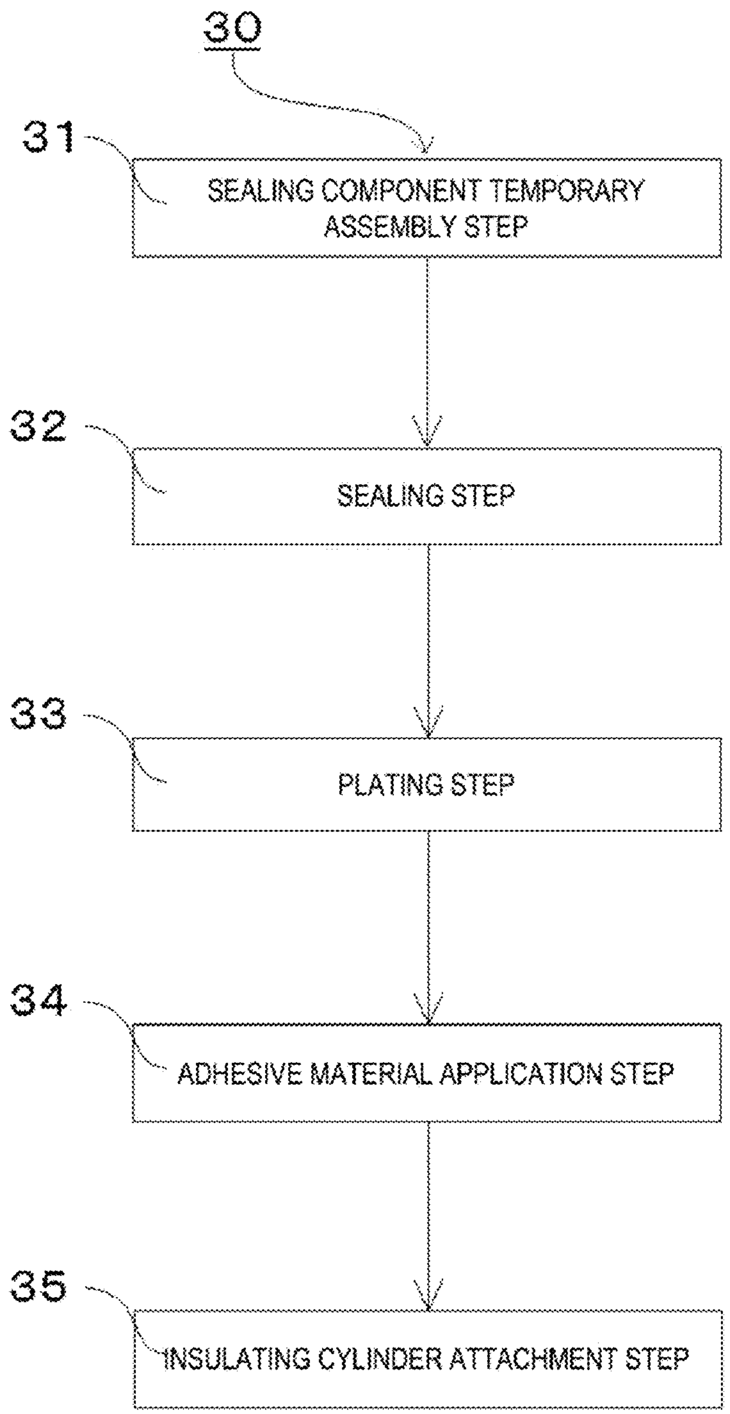
FIG. 3 is a flowchart of a manufacturing method of the hermetic terminal according to the present invention.
Figure 4:
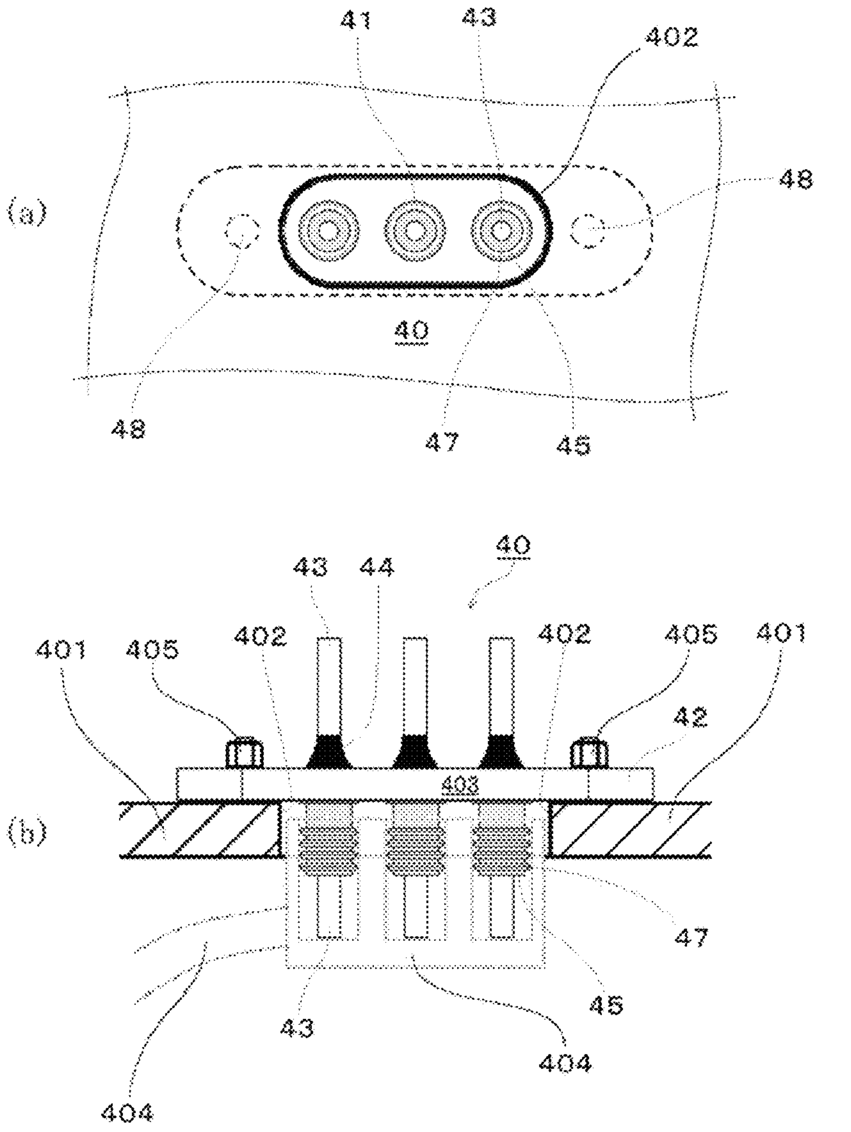
FIG. 4 illustrates a state of attachment of the hermetic terminal according to the present invention to a hermetic container, where (a) is a plan view of the hermetic container with a wiring block of an electrical device removed, as viewed from inside the hermetic container, and (b) is a partial cross-sectional view of a front surface of the hermetic container.

As illustrated in FIG. 3, a manufacturing method 30 of a hermetic terminal according to the present invention includes (1) first, in a sealing component temporary assembly step 31, placing a ring-like outer metal member including a sealing hole at a predetermined position of a sealing jig prepared in advance, placing a tablet made of a glass insulating material into the sealing hole, the tablet including an insertion hole for inserting a lead, further placing the lead into the insertion hole with the lead penetrating and being inserted through the insertion hole and, while maintaining this state, temporarily assembling on the sealing jig the ring-like outer metal member, the insulating material, and the lead of the hermetic terminal. (2) Subsequently, the manufacturing method 30 includes, in a sealing step 32, passing the sealing jig on which the sealing component is placed through a sealing furnace adjusted in atmosphere and in temperature to predetermined sealing conditions to insulate and seal the lead from and to the ring-like outer metal member by the insulating material. (3) The manufacturing method 30 may include, in a plating step 33 provided as necessary, forming a plating layer on a desired metal surface of the hermetic terminal after sealing. (4) The manufacturing method 30 includes, in an adhesive application step 34, further applying an adhesive to a predetermined surface of the insulating material or the ring-like outer metal member of the hermetic terminal after sealing. The application of the adhesive may be extended to a portion of the lead, as necessary. (5) Lastly, the manufacturing method 30 includes, in an insulating cylinder attachment step 35, fitting an insulating cylinder made of plastic or rubber having heat resistance and oil/refrigerant resistance and prepared in advance onto the lead, pressing the insulating cylinder such that the insulating cylinder comes into close contact with an application surface of the adhesive, and curing the adhesive to adhere the insulating cylinder to the hermetic terminal. The insulating cylinder includes one of a sealing member made of an elastic material having heat resistance and oil/refrigerant resistance in a circumferential groove formed in an outer diameter portion, or a protrusion formed by extending a portion of the outer diameter portion of the insulating cylinder and surrounding the outer diameter portion. The sealing member is attached to the circumferential groove formed in the outer circumferential wall of the insulating cylinder before or after the insulating cylinder attachment step 35. The insulating cylinder composed of a molded member made of rubber has a sealing function by the member only, and thus may be only provided with a protrusion for sealing on the outer diameter portion of the insulating cylinder. As illustrated in FIG. 4, after the lead is electrically connected to a wiring block 404 of an electrical device, such as an electric motor, provided in an interior of a container body 401, the hermetic terminal according to the present invention manufactured by the manufacturing method 30 of a hermetic terminal is inserted into an insertion hole 402 of the container body 401 and hermetically fixed to the container body 401 by a spiral lock 405 or the like. At this time, the hermetic terminal is fixed to the container body 401 with a gasket interposed between the container body 401 and the ring-like outer metal member of the hermetic terminal, as necessary.

As illustrated in FIG. 4, a hermetic container 40 according to the present invention is a hermetic container including the hermetic terminal 10 or 20 described above. The hermetic container 40 includes the container body 401 accommodating an electrical device, such as an electric motor, a hermetic terminal 403 closing the insertion hole 402 provided in the container body 401 and extending through the container body 401 and hermetically fixed to the container body 401, and the wiring block 404 of the electrical device electrically connected in a watertight manner to the lead of the hermetic terminal 403 disposed in an interior of the container body 401. The hermetic terminal 403 includes a ring-like outer metal member 42 including a sealing hole 41, a lead 43 inserted through the sealing hole 41 of the ring-like outer metal member 42, an insulating material 44 made of glass and hermetically sealing the lead 43 to the ring-like outer metal member 42, and an insulating cylinder 45 composed of a molded member made of a super engineering plastic having heat resistance and oil/refrigerant resistance, such as polybutylene terephthalate (PBT), polyphenylene sulfide (PPS), or polyetheretherketone (PEEK), or made of rubber having heat resistance and oil/refrigerant resistance, such as hydrogenated nitrile rubber (HNBR) or ethylene-propylene-diene rubber (EPDM), the insulating cylinder 45 being fitted onto the lead 43 and hermetically adhering, at at least an end portion of the insulating cylinder 45, to the insulating material 44 or the ring-like outer metal member 42 via an adhesive layer 400. The insulating cylinder 45 is formed with one or more circumferential grooves 46 in an outer circumferential wall with a sealing member 47 composed of rubber having heat resistance and oil/refrigerant resistance fitted into the circumferential groove 46, or does not include the circumferential groove 46 and includes one or more protrusions 47 formed by projecting the outer circumferential wall of the insulating cylinder 45. The protrusion 47 is provided by causing the insulating cylinder itself to project so as to surround the outer diameter of the outer circumferential wall of the insulating cylinder 45. The ring-like outer metal member 42 may be further provided with a through-hole 48 for spirally locking 405 the ring-like outer metal member 42 to the container body 401, as necessary. The through-hole 48 is provided for fastening and hermetically fixing the hermetic terminal 403 of the present invention to the container body 401 of the electrical device by means such a spiral lock. Provided that the ring-like outer metal member 42 of the hermetic terminal 403 is fixed to a container wall of the container body 401, other forms instead of the through-hole 48, such as a frame body, may be adopted. Such a frame body covers, in a frame-like shape, at least an outer peripheral edge of the ring-like outer metal member 42 and an outer peripheral edge of the insertion hole 402, and fixes the hermetic terminal 403 and the container body 401 to each other so that the ring-like outer metal member 42 of the hermetic terminal does not fall out of the insertion hole 402. In a case in which the insulating cylinder 45 is made of plastic, the circumferential groove 46 is formed in the insulating cylinder 45, and the sealing member 47 is attached to the circumferential groove 46. Because the sealing member 47 is constituted by a material different from that of the insulating cylinder 45, this makes it possible to appropriately adjust (suppress to a minimum) the compression set and thus maintain, over a long period of time, stable sealing properties of the wiring block 404 having watertightness and disposed inside the container body 401. On the other hand, in a case in which the insulating cylinder 45 is made of rubber, the insulating cylinder 45 does not include the circumferential groove 46 and is provided with the protrusion 47, and the sealing properties are ensured by the protrusion 47. As a result, metal powder that is produced when the motor is driven and accumulates in the container body 401 is prevented from adhering to a lead connection portion of the hermetic terminal 403, and this improves tracking resistance of a wiring connection portion. Further, entry of polyalkylene glycol (PAG) oil having low insulating properties is also prevented. Thus, the hermetic container 40 can be used for a compressor that uses PAG lubricating oil.

EXAMPLES

As illustrated in FIG. 1, the hermetic terminal 10 of Example 1 includes the ring-like outer metal member 12 made of carbon steel and provided with three sealing holes 11 and two through-holes 18 disposed in a straight line, the leads 13 made of an Fe—Cr alloy and inserted through the sealing holes 11 of the ring-like outer metal member 12, the insulating material 14 made of soda barium glass and hermetically sealing the lead 13 to the ring-like outer metal member 12, and the insulating cylinders 15 made of polyphenylene sulfide (PPS), the insulating cylinders 15 being fitted onto the leads 13 and adhering, at end portions of the insulating cylinders 15, to portions of the ring-like outer metal member 12 and one side of each insulating material 14 via the adhesive layer 100 of an epoxy adhesive. The insulating cylinder 15 includes four circumferential grooves 16 in an outer circumferential wall and includes the sealing member 17 composed of an O-ring made of a fluorine rubber (FKM) in each of the circumferential grooves 16.

As illustrated in FIG. 2, the hermetic terminal 20 of Example 2 includes the ring-like outer metal member 22 made of carbon steel and provided with three sealing holes

21 and two through-holes 28 disposed in a straight line, the leads 23 made of an Fe—Ni alloy and inserted through the sealing holes 21 of the ring-like outer metal member 22, the insulating material 24 made of soda barium glass and hermetically sealing the leads 23 to the ring-like outer metal member 22, and the insulating cylinders 25 made of ethylene-propylene-diene rubber (EPDM), the insulating cylinders 25 being fitted onto the leads 23 and adhering, at end portions of the insulating cylinders 25, to portions of the ring-like outer metal member 22 and one side of each insulating material 24 via an adhesive layer of an epoxy adhesive. The insulating cylinder 25 includes two protrusions 27 on the outer circumferential wall.

The hermetic terminal of Example 1 or Example 2 is attached to the hermetic container 40 illustrated in FIG. 4.

The hermetic terminal of Example 1 is applied to the hermetic container 40 of FIG. 4, and the hermetic container 40 includes the container body 401 accommodating a refrigerant, a lubricating oil, and an electric motor, the hermetic terminal 403 closing the insertion hole 402 provided in the container body 401 and extending through the container body 401 and hermetically fastened by the spiral lock 405, and the wiring block 404 of the electrical device electrically connected in a watertight manner to the leads of the hermetic terminal 403 disposed in an interior of the container body 401. The hermetic terminal 403 includes the ring-like outer metal member 42 made of carbon steel and provided with three sealing holes 41 and two through-holes 48 disposed in a straight line, the leads 43 made of an Fe—Cr alloy and inserted through the sealing holes 41 of the ring-like outer metal member 42, the insulating material 44 made of soda barium glass and hermetically sealing the leads 43 to the ring-like outer metal member 42, and the insulating cylinders 45 made of polyphenylene sulfide (PPS), the insulating cylinders 45 being fitted onto the leads 43 and adhering, at end portions of the insulating cylinders 45, to portions of the ring-like outer metal member 42 and one side of each insulating material 44 via an adhesive layer of an epoxy adhesive. The insulating cylinder 45 includes four circumferential grooves 46 in an outer circumferential wall and includes the sealing members 47 composed of O-rings made of a fluorine rubber (FKM) fitted into each of the circumferential grooves 46. The insulating cylinder 45 and the sealing member 47 can be constituted by different resin materials, making it possible to combine resin materials to optimize sealing elasticity while maintaining structural strength.

That is, the hermetic terminal of Example 1 can be applied to a hermetic container, and constitutes a hermetic container including a container body accommodating an electrical device, a hermetic terminal closing an insertion hole provided in the container body and extending through the container body and hermetically fixed to the container body, and a wiring block of the electrical device electrically connected in a watertight manner to the hermetic terminal disposed in an interior of the container body. The hermetic terminal includes a ring-like outer metal member including a sealing hole, a lead inserted through the sealing hole of the ring-like outer metal member, an insulating material hermetically sealing the lead to the ring-like outer metal member, and an insulating cylinder made of plastic, the insulating cylinder being fitted onto the lead and hermetically adhering, at at least an end portion of the insulating cylinder, to the insulating material or the ring-like outer metal member via an adhesive layer. The insulating cylinder includes one or more circumferential grooves in an outer circumferential wall, and a sealing member composed of an elastic material is fitted into the one or more circumferential grooves. The insulating cylinder is composed of a plastic material made of polyphenylene sulfide (PPS) having heat resistance and oil/refrigerant resistance. The sealing member is composed of an O-ring made of a fluorine rubber (FKM) having heat resistance and oil/refrigerant resistance.

In the hermetic terminal of Example 2, the insulating cylinder 45 includes the protrusion 47 and does not include the circumferential groove 46. The hermetic terminal of Example 2 can also be applied to the hermetic container 40 of FIG. 4, and the hermetic container 40 includes the container body 401 accommodating a refrigerant, a lubricating oil, and an electric motor, the hermetic terminal 403 closing the insertion hole 402 provided in the container body 401 and extending through the container body 401 and hermetically fastened by the spiral lock 405, and the wiring block 404 of the electrical device electrically connected in a watertight manner to the leads of the hermetic terminal 403 disposed in an interior of the container body 401. The hermetic terminal 403 includes the ring-like outer metal member 42 made of carbon steel and provided with three sealing holes 41 and two through-holes 48 disposed in a straight line, the leads 43 made of an Fe—Ni alloy and inserted through the sealing holes 41 of the ring-like outer metal member 42, the insulating material 44 made of soda barium glass and hermetically sealing the leads 43 to the ring-like outer metal member 42, and the insulating cylinders 45 made of ethylene-propylene-diene rubber (EPDM), the insulating cylinders 45 being fitted onto the leads 43 and adhering, at end portions of the insulating cylinders 45, to portions of the ring-like outer metal member 42 and one side of each insulating material 44 via an adhesive layer of an epoxy adhesive. The insulating cylinder 45 includes the protrusion 47 on the outer circumferential wall. The hermetic terminal of Example 2 does not require attachment of the sealing member 47 and can ensure sealing properties by the protrusion 47 of the insulating cylinder 45 made of rubber. This makes it possible to maintain stable sealing performance over a long period of time for the watertight connector block disposed in the hermetic container.

That is, the hermetic terminal of Example 2 can be applied to a hermetic container and constitutes a hermetic container including a container body accommodating an electrical device, a hermetic terminal closing an insertion hole provided in the container body and extending through the container body and hermetically fixed to the container body, and a wiring block of the electrical device electrically connected in a watertight manner to the hermetic terminal disposed in an interior of the container body. The hermetic terminal includes a ring-like outer metal member including a sealing hole, a lead inserted through the sealing hole of the ring-like outer metal member, an insulating material hermetically sealing the lead to the ring-like outer metal member, and an insulating cylinder made of rubber, the insulating cylinder being fitted onto the lead and hermetically adhering, at at least an end portion of the insulating cylinder, to the insulating material or the ring-like outer metal member via an adhesive layer. The insulating cylinder includes one or more protrusions surrounding an outer diameter of the insulating cylinder. The insulating cylinder is composed of a rubber material made of ethylene-propylene-diene rubber (EPDM) having heat resistance and oil/refrigerant resistance.

INDUSTRIAL APPLICABILITY

The present invention can be utilized for a hermetic terminal, and in particular can be suitably applied to a hermetic terminal for an automotive application.

REFERENCE SIGNS LIST

10 Hermetic terminal
11 Sealing hole
12 Ring-like outer metal member
13 Lead
14 Insulating material
15 Insulating cylinder
16 Circumferential groove
17 Sealing member
18 Through-hole
100 Adhesive layer
20 Hermetic terminal
21 Sealing hole
22 Ring-like outer metal member
23 Lead
24 Insulating material
25 Insulating cylinder
27 Protrusion
28 Through-hole
200 Adhesive layer
30 Manufacturing method of hermetic terminal
31 Sealing component temporary assembly step
32 Sealing step
33 Plating step
34 Adhesive application step
35 Insulating cylinder attachment step
40 Hermetic container
41 Sealing hole
42 Ring-like outer metal member
43 Lead
44 Insulating material
45 Insulating cylinder
46 Circumferential groove
47 Sealing member or protrusion
48 Through-hole
400 Adhesive layer
401 Container body
402 Insertion hole
403 Hermetic terminal
404 Wiring block
405 Spiral lock

The invention claimed is:

1. A hermetic terminal comprising:

a ring-like outer metal member including at least one sealing hole;

a lead inserted through the sealing hole of the ring-like outer metal member;

an insulating material hermetically sealing the lead to the ring-like outer metal member; and an insulating cylinder made of plastic, the insulating cylinder being fitted onto the lead and hermetically adhering, at at least an end portion of the insulating cylinder, to the insulating material or the ring-like outer metal member via an adhesive layer, wherein the insulating cylinder includes one or more circumferential grooves in an outer circumferential wall and a sealing member composed of an elastic material in the one or more circumferential grooves.

2. The hermetic terminal according to claim 1, wherein the insulating cylinder is composed of a plastic material having heat resistance and oil/refrigerant resistance.

3. The hermetic terminal according to claim 1, wherein the sealing member is composed of a rubber material having heat resistance and oil/refrigerant resistance.

4. A hermetic terminal comprising:

a ring-like outer metal member including at least one sealing hole;

a lead inserted through the sealing hole of the ring-like outer metal member;

an insulating material hermetically sealing the lead to the ring-like outer metal member; and an insulating cylinder made of rubber, the insulating cylinder being fitted onto the lead and hermetically adhering, at-a least an end portion of the insulating cylinder, to the insulating material or the ring-like outer metal member via an adhesive layer;

wherein the insulating cylinder includes one or more protrusions surrounding an outer diameter of the insulating cylinder.

5. The hermetic terminal according to claim 4, wherein the insulating cylinder is composed of a rubber material having heat resistance and oil/refrigerant resistance.

6. A manufacturing method of a hermetic terminal, the method comprising:

(1) first, placing a ring-like outer metal member including a sealing hole at a predetermined position of a sealing jig prepared in advance, placing a tablet made of an insulating material into the sealing hole, the tablet including an insertion hole for inserting a lead, further placing the lead into the insertion hole with the lead penetrating and being inserted through the insertion hole and, while maintaining this state, temporarily assembling on the sealing jig a sealing component including the ring-like outer metal member, the insulating material, and the lead of the hermetic terminal;

(2) subsequently, passing the sealing jig on which the sealing component is placed through a sealing furnace adjusted in atmosphere and in temperature to predetermined sealing conditions to obtain a hermetic terminal with the lead insulated from and sealed to the ring-like outer metal member by the insulating material;

(3) forming a plating layer on a desired metal surface of the hermetic terminal after sealing, as necessary;

(4) further applying an adhesive to a predetermined surface of the insulating material or the ring-like outer metal member of the hermetic terminal after sealing; and (5) lastly, fitting an insulating cylinder made of plastic or rubber and prepared in advance onto the lead, pressing the insulating cylinder such that the insulating cylinder comes into close contact with an application surface of the adhesive, and curing the adhesive to adhere the insulating cylinder to the hermetic terminal.

7. The manufacturing method of a hermetic terminal according to claim 6, wherein the application surface of the adhesive extends to a portion of the lead.

8. The manufacturing method of a hermetic terminal according to claim 6, wherein the insulating cylinder is composed of a plastic material or a rubber material having heat resistance and oil/refrigerant resistance.

9. The manufacturing method of a hermetic terminal according to claim 6, wherein a sealing member is attached to a circumferential groove formed in an outer circumferential wall of the insulating cylinder before or after step (5).

10. The manufacturing method of a hermetic terminal according to claim 6, wherein the sealing member is composed of a rubber material having heat resistance and oil/refrigerant resistance.

11. A hermetic container comprising:

a container body accommodating an electrical device;

a hermetic terminal closing an insertion hole provided in the container body and extending through the container body and hermetically fixed to the container body; and a wiring block of the electrical device electrically connected in a watertight manner to the hermetic terminal disposed in an interior of the container body, wherein the hermetic terminal includes a ring-like outer metal member including a sealing hole, a lead inserted through the sealing hole of the ring-like outer metal member, an insulating material hermetically sealing the lead to the ring-like outer metal member, and an insulating cylinder made of plastic, the insulating cylinder being fitted onto the lead and hermetically adhering, at at least an end portion of the insulating cylinder, to the insulating material or the ring-like outer metal member, and the insulating cylinder includes one or more circumferential grooves in an outer circumferential wall, and a sealing member composed of an elastic material is fitted into the one or more circumferential grooves.

12. The hermetic container according to claim 11, wherein the insulating cylinder is composed of a plastic material having heat resistance and oil/refrigerant resistance.

13. The hermetic container according to claim 11, wherein the sealing member is composed of a rubber material having heat resistance and oil/refrigerant resistance.

14. A hermetic container comprising:

a container body accommodating an electrical device;

a hermetic terminal closing an insertion hole provided in the container body and extending through the container body and hermetically fixed to the container body; and a wiring block of the electrical device electrically connected in a watertight manner to the hermetic terminal disposed in an interior of the container body, wherein the hermetic terminal includes a ring-like outer metal member including a sealing hole, a lead inserted through the sealing hole of the ring-like outer metal member, an insulating material hermetically sealing the lead to the ring-like outer metal member, and an insulating cylinder made of rubber, the insulating cylinder being fitted onto the lead and hermetically adhering, at least an end portion of the insulating cylinder, to the insulating material or the ring-like outer metal member via an adhesive layer;

wherein the insulating cylinder includes one or more protrusions surrounding an outer diameter of the insulating cylinder.

15. The hermetic container according to claim 14, wherein the insulating cylinder is composed of a rubber material having heat resistance and oil/refrigerant resistance.

* * * * *